United States Patent [19]
Bonten et al.

[11] Patent Number: 4,789,698
[45] Date of Patent: Dec. 6, 1988

[54] FLAME-PROOF, GLASS FIBRE-REINFORCED POLYAMIDE MOULDING MATERIALS

[75] Inventors: Heinz Bonten; Werner Nielinger; Dietrich Michael; Harald Selbeck; Rolf-Volker Meyer, all of Krefeld, Fed. Rep. of Germany

[73] Assignee: Bayer Aktiengesellschaft, Leverkusen, Fed. Rep. of Germany

[21] Appl. No.: 23,726

[22] Filed: Mar. 9, 1987

[30] Foreign Application Priority Data

Mar. 20, 1986 [DE] Fed. Rep. of Germany ....... 3609341

[51] Int. Cl.$^4$ ............................ C08K 5/34; C08K 3/40
[52] U.S. Cl. .................................... 524/100; 524/101; 524/494; 524/606
[58] Field of Search ........................ 524/100, 492, 494

[56] References Cited

U.S. PATENT DOCUMENTS

| Re. 30,402 | 4/1980 | Michael et al. | 524/100 |
| 3,663,495 | 5/1972 | Michael et al. | 524/100 |
| 4,314,927 | 2/1982 | Theysohn et al. | 524/100 |
| 4,360,616 | 11/1982 | Pagilagan | 524/100 |
| 4,530,951 | 7/1985 | Williams | 524/100 |
| 4,552,912 | 11/1985 | Williams | 524/100 |

FOREIGN PATENT DOCUMENTS

| 143918 | 9/1980 | Fed. Rep. of Germany | 524/100 |
| 3248330 | 1/1984 | Fed. Rep. of Germany | 524/100 |
| 4553 | 1/1977 | Japan | 524/100 |
| 16565 | 2/1979 | Japan | 524/100 |

OTHER PUBLICATIONS

Encyclopedia of Polymer Science and Engineering, vol. 3, 1985, pp. 776-820, John Wiley & Sons, New York, U.S.; "Composites".
Encyclopedia of Polymer Science and Technology, vol. 12, 1970, pp. 1-41, John Wiley & Sons, U.S.; "Reinforced Plastics".
Hackh's Chemical Dictionary, 3rd Edition, p. 246, McGraw-Hill Book Co., New York, N.Y., 1944.
Concise Chemical and Technical Dictionary, 3rd Edition, p. 330, Chemical Publishing Co., New York, N.Y., 1974.

*Primary Examiner*—John C. Bleutge
*Assistant Examiner*—David W. Woodward
*Attorney, Agent, or Firm*—Connolly and Hutz

[57] ABSTRACT

Polyamide moulding materials which have been reinforced with unsized glass fibres and to which a flame-proof finish has been imparted by means of melamine or melamine cyanurate and which have a high glow wire resistance.

8 Claims, No Drawings

FLAME-PROOF, GLASS FIBRE-REINFORCED POLYAMIDE MOULDING MATERIALS

The invention relates to polyamide moulding materials which have been reinforced with unsized glass fibres and to which a flame-proof finish has been imparted by means of melamine or melamine cyanurate and which have a high glow wire resistance.

In recent times polyamides which have been rendered fire-retardant have acquired an increasing importance. In this regard there is a particular interest in products in light colour formulations for the electrical sector. However, of the known fire-retardant systems, red phosphorus and halogen compounds in combination with synergists are not suitable for this field of use. Halogen compounds impair the electrical properties, such as tracking resistance and dielectric strength, while red phosphorus is not suitable because of its dark inherent colour.

The addition of melamine is recommended in DAS (German Published Specification) No. 1,694,254 for the preparation of light-coloured, non-reinforced, flame-resistant polyamides. In the case of polyamides reinforced with glass fibres, melamine and melamine salts, such as, for example, melamine cyanurate, are less effective; the glow wire resistance of these products is low.

According to a suggestion in German Patent Specification No. 1,803,606 it is admittedly possible to reduce the amount of melamine by means of halogen compounds having a synergistic action. However, since the effect of the halogen compounds is to reduce the tracking resistance of the polyamide components, their use in the electrical sector for components carrying a potential is considerably limited.

It has now been found, surprisingly, that the flame-resistance and the glow wire resistance of polyamides which have been reinforced with glass fibres and to which a fire-retardant finish has been imparted by means of melamine or melamine cyanurate can be improved markedly if unsized fibres are used instead of the glass fibres treated with a size which are customary in practice.

The invention therefore relates to flame-proofed, reinforced polyamide moulding materials containing 3–25, preferably 5–20, % by weight of melamine or melamine cyanurate and 5–45, preferably 10–40, % by weight of unsized glass fibres.

In this regard, it is particularly preferable to employ melamine in amounts of 10–15% by weight and melamine cyanurate in amounts of 5–10% by weight.

Compared with the polyamides reinforced with sized glass fibres, the polyamide moulding materials according to the invention are distinguished by shorter afterburn times and by a high glow wire resistance which is particularly important in the case of shaped articles carrying an electric potential.

Aliphatic polyamides which are prepared by known polycondensation processes from diamines and dicarboxylic acids or lactams having at least 7 ring members or the corresponding ω-aminocarboxylic acids are particularly suitable for the preparation of the moulding materials according to the invention. Examples of suitable starting materials are dicarboxylic acids, such as adipic acid, 2,2,4-trimethylhexamethylenediamine, 2,4,4-trimethylhexamethylenediamine, azelaic acid, sebacic acid, decanedicarboxylic acid and diamines such as 1,4-diaminobutane, 1,6-diaminohexane, 2,2,4-trimethylhexamethylenediamine and 2,4,4-trimethylhexamethylenediamine, the isomeric diaminodicyclohexylmethanes and diaminodicyclohexylpropanes, isophoronediamine and bis-aminomethyl-cyclohexane, and also aminocarboxylic acids, such as ω-aminocaproic acid, ω-aminoundecanoic acid, ω-aminolauric acid or the corresponding lactams. Copolyamides formed from several of the monomers mentioned are, of course, included. The copolyamides can also contain monomers having aromatic ring systems, such as isophthalic acid, terephthalic acid or the isomeric xylylenediamines. Polyamide 6,6 and polyamide 6 are particularly suitable.

Suitable glass fibres are unsized glass fibres, preferably ground glass fibres, the diameter of which should be 6–18, preferably 9–16, μm. The fibres are preferably prepared from E-glass, a low alkali content, water-resistant borosilicate glass containing less than 1% of alkali metal oxide ($Na_2O$ and $K_2O$).

The polyamide moulding materials according to the invention are prepared by mixing the unsized glass fibres and the melamine or melamine cyanurate with the polyamide melt in single-screw or multi-screw extruders of conventional design, it being possible to add glass fibres and melamine or melamine cyanurate simultaneously or successively to the polyamide melt. It is also possible to incorporate the additives separately, for example to incorporate the melamine or melamine cyanurate into the melt of reinforced polyamide. It is also possible to employ the melamine or melamine cyanurate in the form of a concentrate and also to process a mixture of granules composed of the concentrate and glass fibre-reinforced polyamide in an injection moulding machine.

The polyamide moulding materials according to the invention to which a fire-retardant finish has been imparted can additionally be treated with the customary additives, such as mould release agents, lubricants, stabilizers, dyestuffs, pigments and fillers, in the customary amounts. The known adhesion promoters, preferably silane compounds, such as are described in DOS (German Published Specification) No. 1,965,434, for improving the mechanical properties are not critical in regard to behaviour in fire; they are preferably sprayed onto the granules before processing. γ-Aminopropyl-triethoxysilane can be used particularly preferentially as an adhesion promoter.

The polyamide moulding materials according to the invention are suitable for the production of shaped articles for the industrial field, particularly for the electrical sector. They are employed with particular advantage in cases where they come into contact with components carrying a potential. Plug connectors, terminal blocks or air-break contactors may be mentioned as examples.

EXAMPLE 1

55 parts by weight of polyamide 66 having a relative viscosity of 3.0, measured on a 1% strength solution in m-cresol at 25° C. in an Ubbelohde viscometer, 30 parts by weight of short glass fibres and 15 parts by weight of melamine are mixed at approx 285°–295° C. in a Werner und Pfleiderer type ZSK 53 twin-screw extruder. The short glass fibres are ground, unsized fibres of E-glass, having a fibre diameter of approx. 10 μm.

The fire test as specified in UL Subj. 94 gives V0 for test specimens having wall thicknesses of 3.2, 1.6 and 0.8 mm.

In the glow wire test as specified in IEC 695-2-1, 960° C. is achieved at wall thicknesses of 1, 2 and 3 mm.

EXAMPLE 2

62.5 parts by weight of polyamide 66, 30 parts by weight of short glass fibres and 7.5 parts by weight of melamine cyanurate are compounded in a ZSK 53 as in Example 1.

The fire test as specified in UL, Subj. 94 gives V2 for test specimens having wall thicknesses of 3.2, 1.6 and 0.8 mm.

The glow wire test as specified in IEC 695-2-1 is passed at 960° C. at wall thicknesses of 1, 2 and 3 mm.

COMPARISON EXAMPLE 3

70 parts by weight of polyamide 66 and 30 parts by weight of unsized short glass fibres are compounded in a ZSK 53 as in Example 1.

In the fire test as specified in UL, Subj. 94, V2 is found at a wall thickness of 3.2 mm and HB is found at wall thicknesses of 1.6 and 0.8 mm.

The glow wire test results in 850° C. for a wall thickness of 1 mm and 960° C. for wall thicknesses of 2 and 3 mm.

COMPARISON EXAMPLE 4

60 parts by weight of polyamide 66, 30 parts by weight of sized glass fibres having a diameter of approx. 10 µm and 10 parts by weight of melamine cyanurate are compounded in a twin-screw extruder (ZSK 32) as in Example 1.

The fire test as specified in UL, Subj. 94, results in V2 at wall thicknesses of 3.2, 1.6 and 0.8 mm.

In the glow wire test, 750° C. is reached at layer thicknesses of 1 and 2 mm and 850° C. at a layer thickness of 3 mm.

EXAMPLE 5

65 parts by weight of polyamide 66 having a relative viscosity of 3.0, measured on a 1% strength solution in m-cresol at 25° C. in an Ubbelohde viscometer, 20 parts by weight of short glass fibres and 15 parts by weight of melamine are mixed at 280° C. in a Werner und Pfleiderer type ZSK 53 twin-screw extruder. The short glass fibres are ground, unsized fibres having a fibre diameter of approx. 14 µm. The fibre consists of E-glass and contains 0.05% by weight of µ-aminopropyltriethoxysilane to improve the adhesion.

The fire test as specified in UL, Subj. 94, results in V0 for test specimens having wall thicknesses of 3.2, 1.6 and 0.8 mm.

EXAMPLE 6

62.5 parts by weight of polyamide 6 having a relative viscosity of 2.9, 30 parts by weight of unsized, ground short glass fibres having a fibre diameter of 10 µm and 7.5 parts by weight of melamine cyanurate are compounded at approx. 275°-285° C. in a Werner und Pfleiderer type ZSK 83 twin-screw extruder.

In the fire test as specified in UL, the product is rated at V2 at wall thicknesses of 3.2 and 1.6 mm.

In the glow wire test as specified in IEC 695-2-1, 960° C. is reached at wall thicknesses of 1 and 2 mm and 750° C. at a wall thickness of 3 mm.

COMPARISON EXAMPLE 7

60 parts by weight of polyamide 6, 30 parts by weight of a coated glass fibre having a diameter of approx. 10 µm and 10 parts by weight of melamine cyanurate are compounded as in Example 6.

The fire test as specified in UL results in V2 for wall thicknesses of 3.2 and 1.6 mm.

In the glow wire test, 650° C. is found for wall thicknesses of 1, 2 and 3 mm.

COMPARISON EXAMPLE 8

70 parts by weight of polyamide 6 and 30 parts by weight of sized glass fibre are compounded as in Comparison Example 7, with no added fire-retardant.

HB is found in the UL test at wall thicknesses of 3.2 and 1.6 mm.

The glow wire test results in 650° C. for wall thicknesses of 1 and 2 mm and 750° C. for a wall thickness of 3 mm.

We claim:

1. A reinforced polyamide moulding material with flame-retardant properties comprising polyamide 6 or polyamide 66 containing 3 to 25% by weight of melamine, melamine cyanurate or a mixture thereof and 5 to 45% by weight of unsized glass fibres.

2. A moulding material according to claim 1, containing 5 to 20% by weight of melamine, melamine cyanurate or a mixture thereof and 10 to 40% by weight of unsized glass fibres.

3. A moulding material according to claim 1, containing melamine in an amount of 10 to 15% by weight and melamine cyanurate in an amount of 5 to 10% by weight.

4. A moulded article formed of a moulding material according to claim 1.

5. A reinforced polyamide material comprising 55 parts by weight of polyamide 66 having a relative viscosity of 3.0, measured on a 1% strength solution in m-cresol at 25° C. in an Ubbelohde viscometer, 30 parts by weight of short glass fibres and 15 parts by weight of melamine, where the short glass fibres are ground, unsized fibres, having a fibre diameter of approximately 10 µm.

6. A reinforced polyamide material comprising 62.5 parts by weight of polyamide 66, 30 parts by weight of unsized glass fibres and 7.5 parts by weight of melamine cyanurate.

7. A reinforced polyamide material comprising 65 parts by weight of polyamide 66 having a relative viscosity of 3.0, measured on a 1% strength solution in m-cresol at 25° C. in an Ubbelohde viscometer, 20 parts by weight of short glass fibres and 15 parts by weight of melamine, where the short glass fibres are ground, unsized fibres having a fibre diameter of approximately 14 µm.

8. A reinforced polyamide material comprising 62.5 parts by weight of polyamide 6 having a relative viscosity of 2.9, measured on a 1% strength solution in m-cresol at 25° C. in an Ubbelohde viscometer, 30 parts by weight of unsized, ground glass fibres having a fibre diameter of 10 µm and 7.5 parts by weight of melamine cyanurate.

* * * * *